United States Patent
Dunn

(10) Patent No.: US 7,925,815 B1
(45) Date of Patent: Apr. 12, 2011

(54) MODIFICATIONS TO INCREASE COMPUTER SYSTEM SECURITY

(76) Inventor: David Dunn, Sammamish, WA (US)

( * ) Notice: Subject to any disclaimer, the term of this patent is extended or adjusted under 35 U.S.C. 154(b) by 189 days.

(21) Appl. No.: 11/479,703

(22) Filed: Jun. 29, 2006

(51) Int. Cl.
G06F 13/00 (2006.01)
G06F 13/24 (2006.01)
G06F 13/28 (2006.01)

(52) U.S. Cl. ......... 710/316; 710/260; 711/147; 711/152
(58) Field of Classification Search .................. 711/147, 711/152; 710/260, 316
See application file for complete search history.

(56) References Cited

U.S. PATENT DOCUMENTS

| | | | |
|---|---|---|---|
| 5,627,962 A * | 5/1997 | Goodrum et al. | 714/13 |
| 5,638,532 A * | 6/1997 | Frame et al. | 711/154 |
| 5,682,509 A * | 10/1997 | Kabenjian | 710/312 |
| 5,805,880 A * | 9/1998 | Pearce et al. | 713/2 |
| 5,809,314 A * | 9/1998 | Carmean et al. | 713/322 |
| 5,857,116 A | 1/1999 | Ayash et al. | |
| 5,867,642 A * | 2/1999 | Vivio et al. | 714/8 |
| 5,909,696 A | 6/1999 | Reinhardt et al. | |
| 5,913,058 A | 6/1999 | Bonola | |
| 6,026,472 A * | 2/2000 | James et al. | 711/147 |
| 6,125,450 A * | 9/2000 | Kardach | 713/323 |
| 6,175,890 B1 * | 1/2001 | Yamaura | 710/267 |
| 6,192,455 B1 * | 2/2001 | Bogin et al. | 711/154 |
| 6,339,808 B1 * | 1/2002 | Hewitt et al. | 710/260 |
| 6,378,022 B1 * | 4/2002 | Moyer et al. | 710/260 |
| 6,381,682 B2 * | 4/2002 | Noel et al. | 711/153 |
| 6,453,278 B1 * | 9/2002 | Favor et al. | 703/27 |
| 6,658,515 B1 * | 12/2003 | Larson et al. | 710/260 |
| 6,694,401 B2 * | 2/2004 | Nalawadi et al. | 711/2 |
| 6,725,289 B1 * | 4/2004 | Waldspurger et al. | 710/9 |
| 6,751,679 B1 * | 6/2004 | Arndt et al. | 710/3 |
| 6,775,728 B2 | 8/2004 | Zimmer et al. | |
| 6,871,328 B1 * | 3/2005 | Fung et al. | 716/1 |
| 7,130,951 B1 * | 10/2006 | Christie et al. | 710/261 |
| 7,149,854 B2 * | 12/2006 | Weber et al. | 711/152 |
| 7,216,189 B2 * | 5/2007 | Berlin | 710/260 |
| 7,269,678 B2 * | 9/2007 | Nishimura | 710/260 |
| 7,418,584 B1 * | 8/2008 | Klaiber et al. | 712/229 |
| 7,426,657 B2 * | 9/2008 | Zorek et al. | 714/13 |
| 7,457,903 B2 * | 11/2008 | Purdham et al. | 710/269 |
| 7,464,211 B2 * | 12/2008 | Shah | 710/267 |
| 7,496,966 B1 * | 2/2009 | McGrath et al. | 726/27 |

(Continued)

FOREIGN PATENT DOCUMENTS

DE 4342220 A1 * 6/1994

(Continued)

OTHER PUBLICATIONS

Duflot et al., "Using CPU System Management Mode to Circumvent Operating System Security Functions", Apr. 20, 2006, LRI, Universite de Paris Sud, pp. 1-15, retrieved from the Internet on May 7, 2008 at http://www.ssi.gouv.fr/fr/sciences/fichiers/lti/cansecwest2006-duflot-paper.pdf.*

(Continued)

*Primary Examiner* — Faisal M Zaman

(57) ABSTRACT

Methods and systems for processing more securely. More specifically, embodiments provide effective and efficient mechanisms for reducing APIC interference with accesses to SMRAM, where processor and/or northbridge modifications implementing these mechanisms effectively reduce APIC attacks and increase the security of proprietary, confidential or otherwise secure data stored in SMRAM.

22 Claims, 15 Drawing Sheets

U.S. PATENT DOCUMENTS

| | | | |
|---|---|---|---|
| 7,525,679 B2 * | 4/2009 | Taylor et al. | 358/1.15 |
| 7,610,426 B1 | 10/2009 | Dunn | |
| 7,797,555 B2 * | 9/2010 | Zmudzinski et al. | 713/300 |
| 2001/0052056 A1 * | 12/2001 | Acton et al. | 711/147 |
| 2003/0028781 A1 * | 2/2003 | Strongin | 713/182 |
| 2003/0084256 A1 * | 5/2003 | McKee | 711/152 |
| 2003/0126349 A1 | 7/2003 | Nalawadi et al. | |
| 2004/0117562 A1 * | 6/2004 | Wu et al. | 711/147 |
| 2004/0123090 A1 | 6/2004 | Zimmer et al. | |
| 2005/0097384 A1 * | 5/2005 | Uehara et al. | 714/1 |
| 2005/0182879 A1 * | 8/2005 | Vu | 710/260 |
| 2006/0277356 A1 * | 12/2006 | Speier et al. | 711/5 |
| 2007/0186023 A1 * | 8/2007 | Ho | 710/266 |
| 2008/0114916 A1 | 5/2008 | Hummel et al. | |
| 2008/0222365 A1 * | 9/2008 | Szewerenko et al. | 711/147 |
| 2009/0144510 A1 * | 6/2009 | Wibling et al. | 711/147 |
| 2010/0122077 A1 * | 5/2010 | Durham | 713/100 |
| 2010/0169631 A1 * | 7/2010 | Yao et al. | 713/2 |

FOREIGN PATENT DOCUMENTS

| | | | |
|---|---|---|---|
| EP | 617364 A2 * | 9/1994 | |
| EP | 1357454 A1 * | 10/2003 | |
| GB | 2259166 A * | 3/1993 | |
| JP | 06095769 A * | 4/1994 | |
| JP | 2005128591 A * | 5/2005 | |
| WO | WO 9918511 A1 * | 4/1999 | |

OTHER PUBLICATIONS

"MultiProcessor Specification", Version 1.4, May 1997, Intel Corporation, p. 3-12.*

Sriprasad et al., "Dynamic Software Reconfiguration Using System-Level Management," Nov. 5-9, 1995, IEEE, 14$^{th}$ Digital Avionics Systems Conference, pp. 336-341.*

Liu et al., "Application research of trusted computing platform in electric power information system," May 30-31, 2010, IEEE, 2010 2$^{nd}$ International Conference on Networking and Digital Society (ICNDS), vol. 1, pp. 212-215.*

Azab et al., "HyperSentry: Enabling Stealthy In-context Measurement of Hypervisor Integrity", Oct. 4-8, 2010, ACM, 17$^{th}$ ACM Conference on Computer and Communications Security, pp. 38-49.*

Gardner et al., "Detecting Code Alteration by Creating a Temporary Memory Bottleneck," Dec. 2009, IEEE, IEEE Transactions on Information Forensics and Security, vol. 4, No. 4, pp. 638-650.*

Notice of Allowance Dated Feb. 27, 2009; U.S. Appl. No. 11/644,244.

Non Final OA Dated Sep. 29, 2008; U.S. Appl. No. 11/644,244.

Final Office Action Dated Dec. 8, 2009; U.S. Appl. No. 11/479,486.

Notice of Allowance, Mail Date Jun. 22, 2009; U.S. Appl. No. 11/644,224.

Non Final Office Action, Mail Date Jul. 21, 2009, U.S. Appl. No. 11/479,486.

Non-Final Office Action Dated May 4, 2010; U.S. Appl. No. 11/479,486.

Office Action dated Oct. 14, 2010, U.S. Appl. No. 11/479,486.

* cited by examiner

600

MODIFICATIONS TO INCREASE COMPUTER SYSTEM SECURITY

RELATED APPLICATIONS

The present application is related to U.S. patent application Ser. No. 11/479,486, filed Jun. 29, 2006, entitled "PROCESSOR MODIFICATIONS TO INCREASE COMPUTER SYSTEM SECURITY," naming David A. Dunn as the inventor, assigned to the assignee of the present invention. That application is incorporated herein by reference in its entirety and for all purposes.

The present application is related to U.S. patent application Ser. No. 11/644,224, filed Dec. 22, 2006, entitled "SYSTEM MANAGEMENT MODE CODE MODIFICATIONS TO INCREASE COMPUTER SYSTEM SECURITY," naming David A. Dunn as the inventor, assigned to the assignee of the present invention. That application is incorporated herein by reference in its entirety and for all purposes.

BACKGROUND OF THE INVENTION

Most all modern central processing units, namely those based on the x86 architecture, employ system management random access memory (SMRAM) to carry out trusted system management mode (SMM) operations. While in SMM, the processor can execute code and access data held in an area of system memory known as SMRAM. SMRAM is protected from all operating system and device accesses. As such, in reliance upon the privileged nature of SMM, developers continue to place increasing amounts of secure data within SMRAM.

In addition to SMRAM, most modern CPUs also utilize a local advanced programmable interrupt controller (APIC) for managing CPU interrupts. Most APICs are implemented within the CPU and mapped to physical memory, where the APIC mapping may be moved within physical memory by altering a base address (e.g., "APICBASE") within the APICBASE model specific register of the processor. This APICBASE register can be written even when the processor is not running in SMM. As such, an unauthorized user may utilize the APIC to attack a computer system running in SMM by moving the APIC mapping over SMRAM, thereby derailing SMRAM requests and forcing trusted SMM code to read different values than it previously wrote. Additionally, unauthorized users may place the APIC mapping over code stacks within physical memory to jump out of SMRAM upon return from SMM subroutines, thereby enabling the mounting of larger attacks.

SUMMARY OF THE INVENTION

Accordingly, a need exists to improve the security of processors utilizing SMRAM and an APIC. Additionally, a need exists to reduce the ability of the APIC to compromise the security of SMRAM and SMM operation. Furthermore, a need exists to modify existing processor and northbridge designs to reduce APIC interference with accesses to SMRAM.

Embodiments of the present invention are directed to methods and systems for processing more securely. More specifically, embodiments provide effective and efficient mechanisms for reducing APIC interference with accesses to SMRAM, where processor and/or northbridge modifications implementing these mechanisms effectively reduce APIC attacks and increase the security of proprietary, confidential or otherwise secure data stored in SMRAM.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
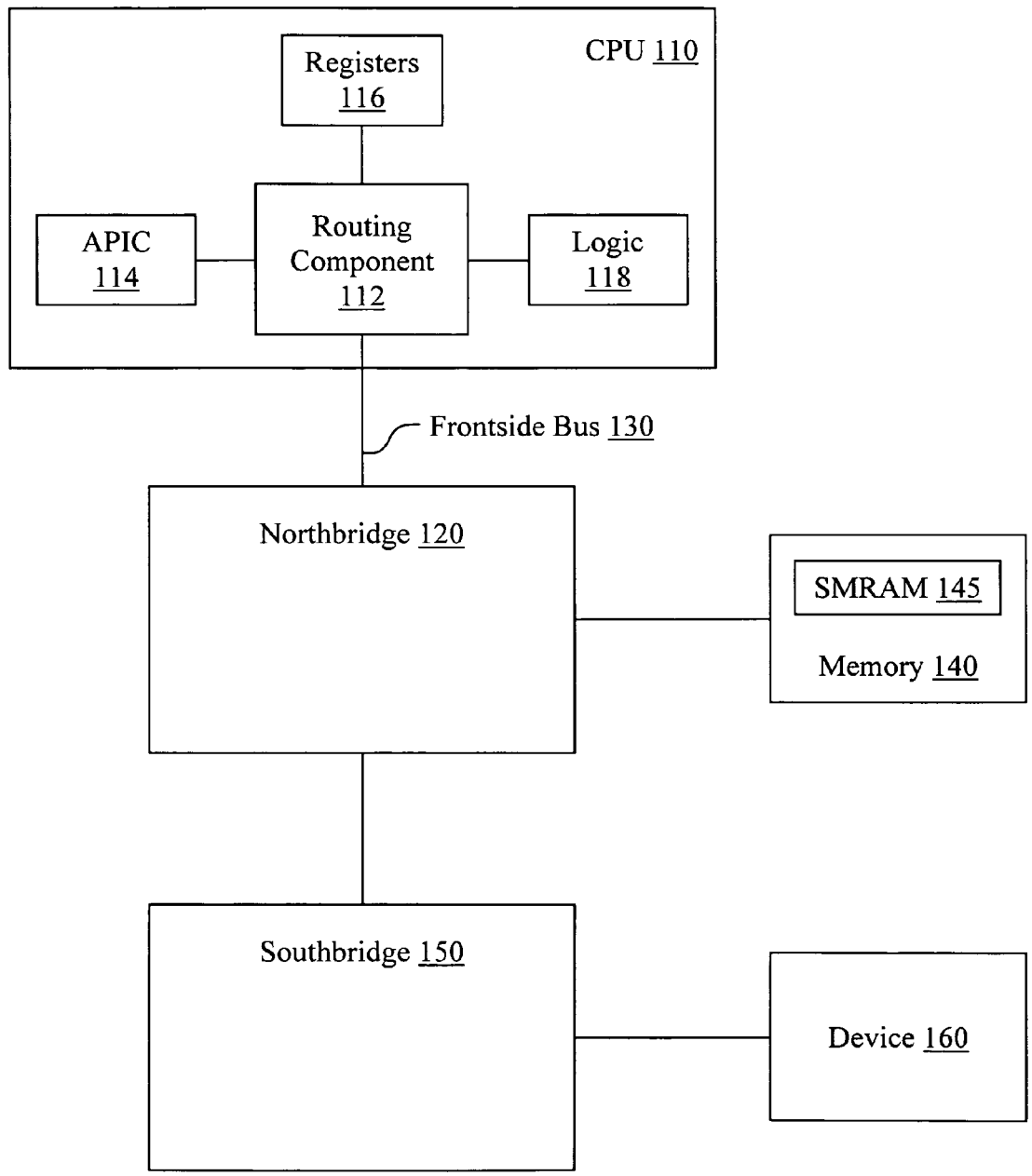
FIG. 1 shows a block diagram of an exemplary computer system for processing more securely in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "writing," "identifying," "defining," "determining," "performing," "processing," "comparing," "repeating," "creating," "modifying," "moving," "establishing," "using," "calculating," "accessing," "generating," "limiting," "copying," "utilizing," "reducing," "tracking," "routing," "updating," "snooping," "preventing," "storing," "enabling," "disabling," "allowing," "denying," "handling," "transferring," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows a block diagram of exemplary computer system 100 for processing more securely in accordance with one embodiment of the present invention. As shown in FIG. 1, x86-compliant central processing unit (CPU) 110 is coupled to northbridge 120 via frontside bus 130. Northbridge 120 enables CPU 110 to communicate with memory 140, where memory 140 comprises system management random access memory (SMRAM) 145. Southbridge 150 is coupled to northbridge 120, thereby enabling CPU 110 to communicate with device 160.

As depicted in FIG. 1, CPU 110 comprises routing component 112 coupled to local advanced programmable interrupt controller (APIC) 114. However, in contrast to conventional x86 processors, CPU 110 comprises additional components to reduce the ability of APIC 114 to compromise the security of SMRAM 145 and system management mode (SMM) operation of CPU 110. Specifically, CPU 110 is modified to include registers 116 coupled to routing component 112 to track the location and/or size of SMRAM. Additionally, logic 118 is also coupled to routing component 112 to enable CPU 110 to reduce APIC interferences with accesses to SMRAM. As such, CPU 110 may effectively reduce APIC attacks and increase the security of proprietary, confidential or otherwise secure data stored in SMRAM 145.

Although computer system 100 is depicted in FIG. 1 as having only a single processor, is should be appreciated that computer system 100 may comprise two or more processors. Additionally, although CPU 110 is depicted in FIG. 1 as having only one routing component (e.g., 112), it should be appreciated that CPU 110 may have two or more routing components in other embodiments, where the multiple routing components may be implemented with one or more APICs corresponding to one or more of the routing components. Similarly, computer system 100 may utilize additional memory components, which may comprise SMRAM. As such, SMRAM may be spread amongst more than one memory module in other embodiments.

CPU 110 may track the location of SMRAM 145 using registers 116, which is important to reducing APIC interference with accesses to SMRAM. Registers 116 may contain any form of data enabling the CPU to determine and/or approximate the location of SMRAM. For example, registers 116 may contain an address indicating the top of SMRAM (e.g., TOM) and/or an address indicating the bottom of SMRAM (e.g., TOM minus TSEG). Alternatively, one or more intermediate addresses indicating the location of SMRAM may be stored within registers 116. Moreover, it should be appreciated that alternate means may be used to locate SMRAM (e.g., by storing an extent of SMRAM on one or both sides of a given address within physical memory, etc.).

Although registers 116 are depicted in FIG. 1 as a single register, it should be appreciated that registers 116 may contain one or more registers. Registers 116 may be model specific registers (MSRs) or non-MSRs, or a combination of the two. Additionally, although registers 116 are depicted as a separate component from routing component 112, they may also be integrated within routing component 112. Moreover, it should be appreciated that the location and/or size of SMRAM may be stored within a single register, or rather each within a separate register. Further, the location and/or size of SMRAM may span more than one register.

Figure 2:
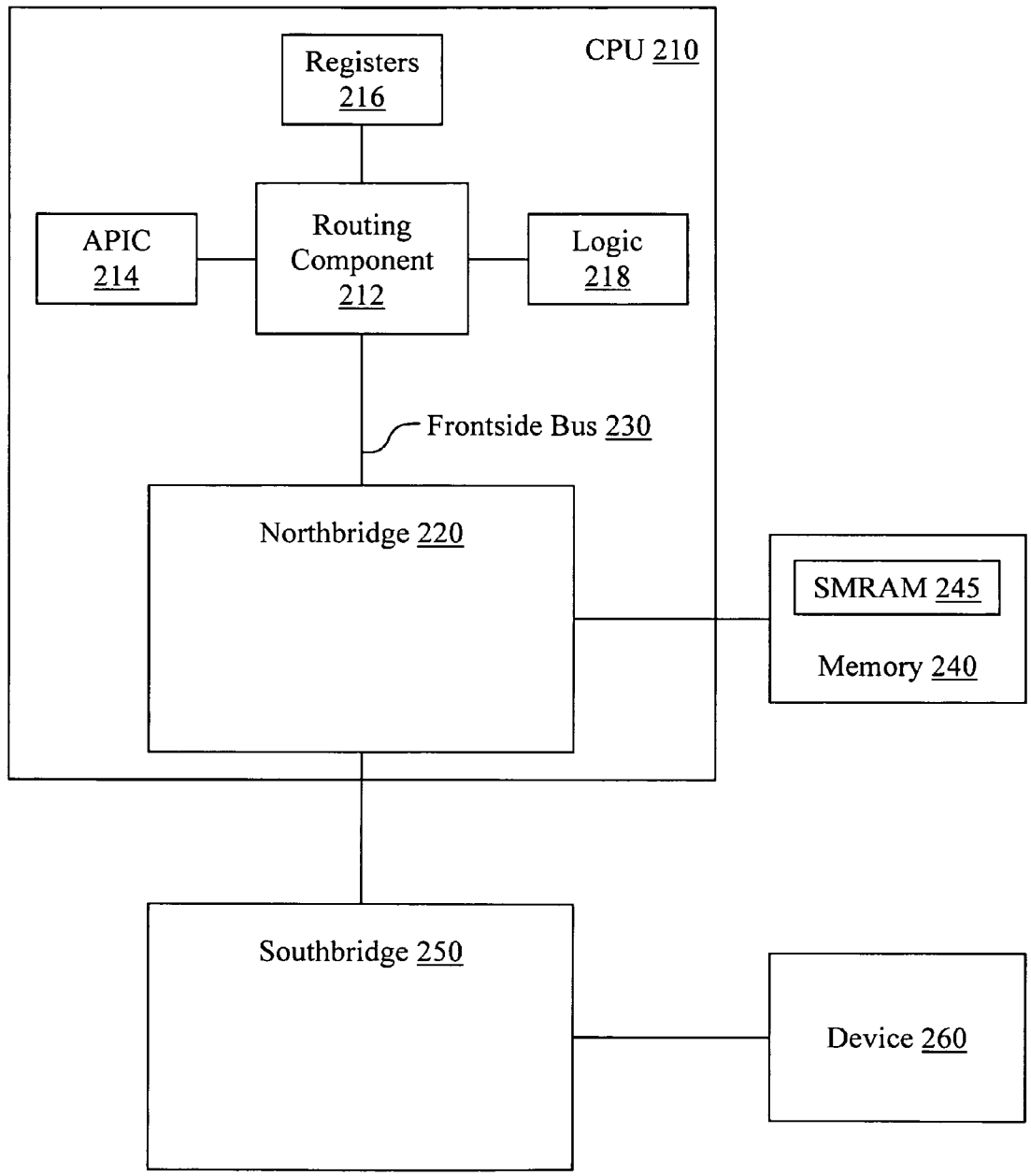
FIG. 2 shows a block diagram of an exemplary computer system with a processor-integrated northbridge for processing more securely in accordance with one embodiment of the present invention.

FIG. 2 shows a block diagram of exemplary computer system 200 with a processor-integrated northbridge for processing more securely in accordance with one embodiment of the present invention. As shown in FIG. 2, computer system 200 is similar to computer system 100, except for the incorporation of northbridge 220 and frontside bus 230 into x86-compliant CPU 210. As such, CPU 210 comprises routing component 212 coupled to APIC 214. And in contrast to conventional x86 processors, CPU 210 comprises additional components to reduce the ability of APIC 214 to compromise the security of SMRAM 245 and the SMM operation of CPU 210. Specifically, CPU 210 is modified to include registers 216 coupled to routing component 212 to track the location and/or size of SMRAM. Additionally, logic 218 is also coupled to routing component 212 to enable CPU 210 to reduce APIC interference with accesses to SMRAM. As such, CPU 210 may effectively reduce APIC attacks and increase the security of proprietary, confidential or otherwise secure data stored in SMRAM 245 similar to computer system 100 as discussed above with respect to FIG. 1.

Given that northbridge 220 is incorporated within CPU 210, memory 240 and southbridge 250 are shown coupled to CPU 210. As such, CPU 210 is able to communicate with memory 240 and device 260 utilizing northbridge 220 and southbridge 250, respectively.

Figure 3:
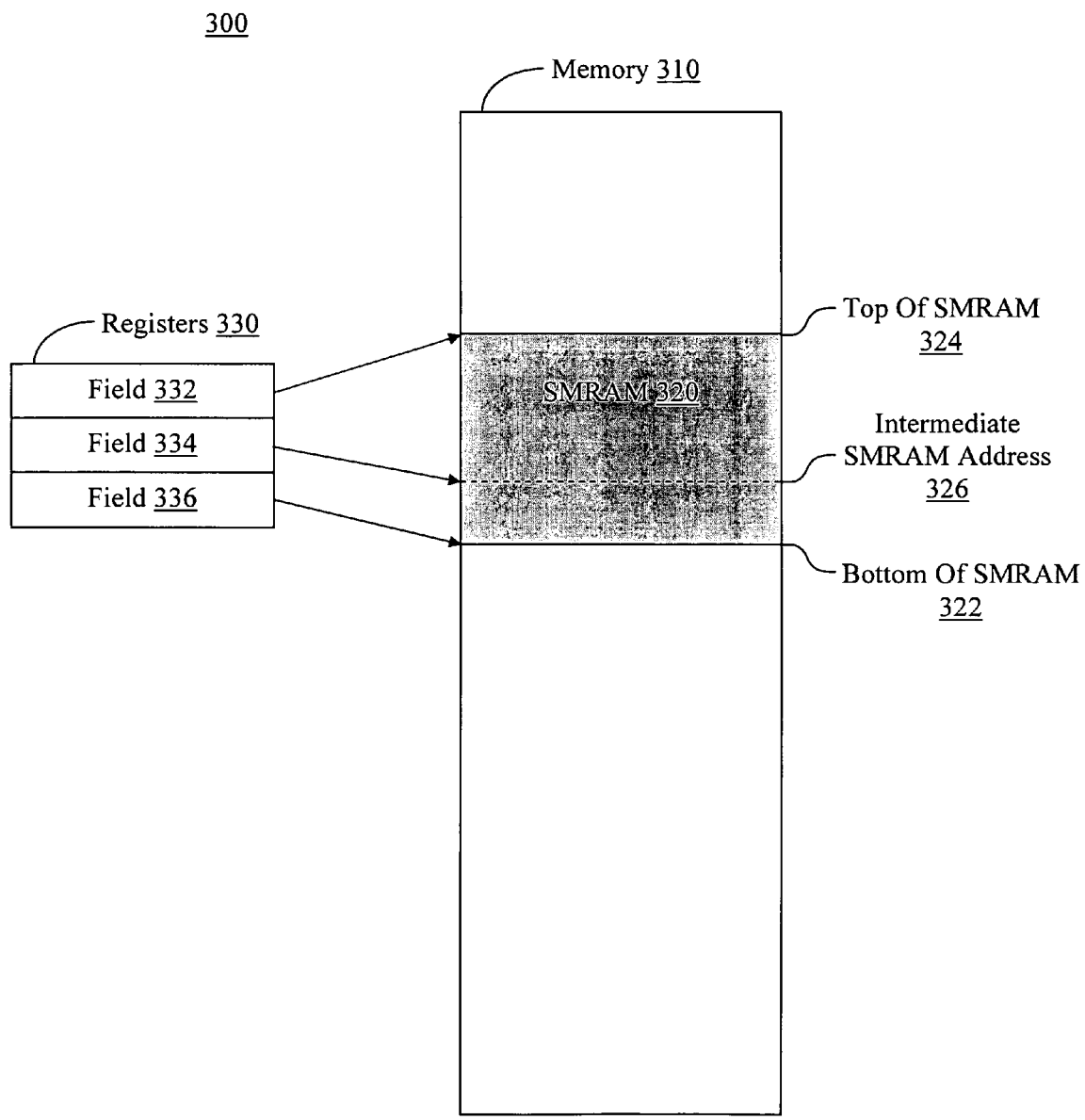
FIG. 3 shows a block diagram depicting SMRAM in memory in accordance with one embodiment of the present invention.

FIG. 3 shows block diagram 300 depicting SMRAM 320 in memory 310 in accordance with one embodiment of the present invention. As shown in FIG. 3, memory 310 may be physical memory (e.g., 140 and/or 240) accessible by a processor (e.g., 110 and/or 210) of a computer system (e.g., 100 and/or 200). Accordingly, a portion of memory 310 may be designated as SMRAM (e.g., 145 and/or 245). For example, SMRAM 320 occupies a portion of memory 310 between addresses bottom of SMRAM 322 and top of SMRAM 324.

To effectively reduce APIC attacks by reducing APIC interference with accesses to SMRAM, a processor may track the location and/or size of SMRAM. As shown in FIG. 3, registers 330 may be used by a processor to track the location of SMRAM 320 within memory 310, where the registers comprise a number of fields. Specifically, field 332 contains information (e.g., a pointer) to top of SMRAM 234, and field 336 contains information about bottom of SMRAM 322. As such, the processor may then determine that SMRAM 320 lies in memory 310 between the addresses bottom of SMRAM 322 and top of SMRAM 324.

Alternatively, the processor may estimate the location and/or size of SMRAM 320 by using one or more known addresses (e.g., stored in registers 330) and information about the extent of SMRAM on either side of the known address or addresses. For example, if the processor knows that SMRAM is roughly 64 kilobytes in length and can access field 336 of registers 330 to determine or estimate bottom of SMRAM 322, the processor can determine top of SMRAM by adding 64 kilobytes to bottom of SMRAM 322. Additionally, the processor may access field 334 of registers 330 to determine intermediate SMRAM address 326. Provided the processor can estimate the extent of SMRAM on either side of intermediate SMRAM address 326 (e.g., 44 kilobytes above and 20 kilobytes below), the processor can determine or approximate the location and/or size of SMRAM.

Registers 330 may comprise one or more registers (e.g., 116 and/or 126) within a processor (e.g. 110 and/or 210) for tracking the size and/or location of SMRAM. As such, registers 330 may be MSRs or non-MSRs. Additionally, although fields 332, 334 and 336 are shown as contiguous fields, it should be appreciated that the fields may be non-contiguous fields with the same or different registers. And although fields 332, 334 and 336 all point to locations representing a contiguous SMRAM block within the same memory (e.g., 310), it should be appreciated that SMRAM may be spread over multiple locations of one or more memories. As such, the fields of registers 330 may point to one or more locations within the same memory, or instead to locations within two or more memories.

Figure 4:
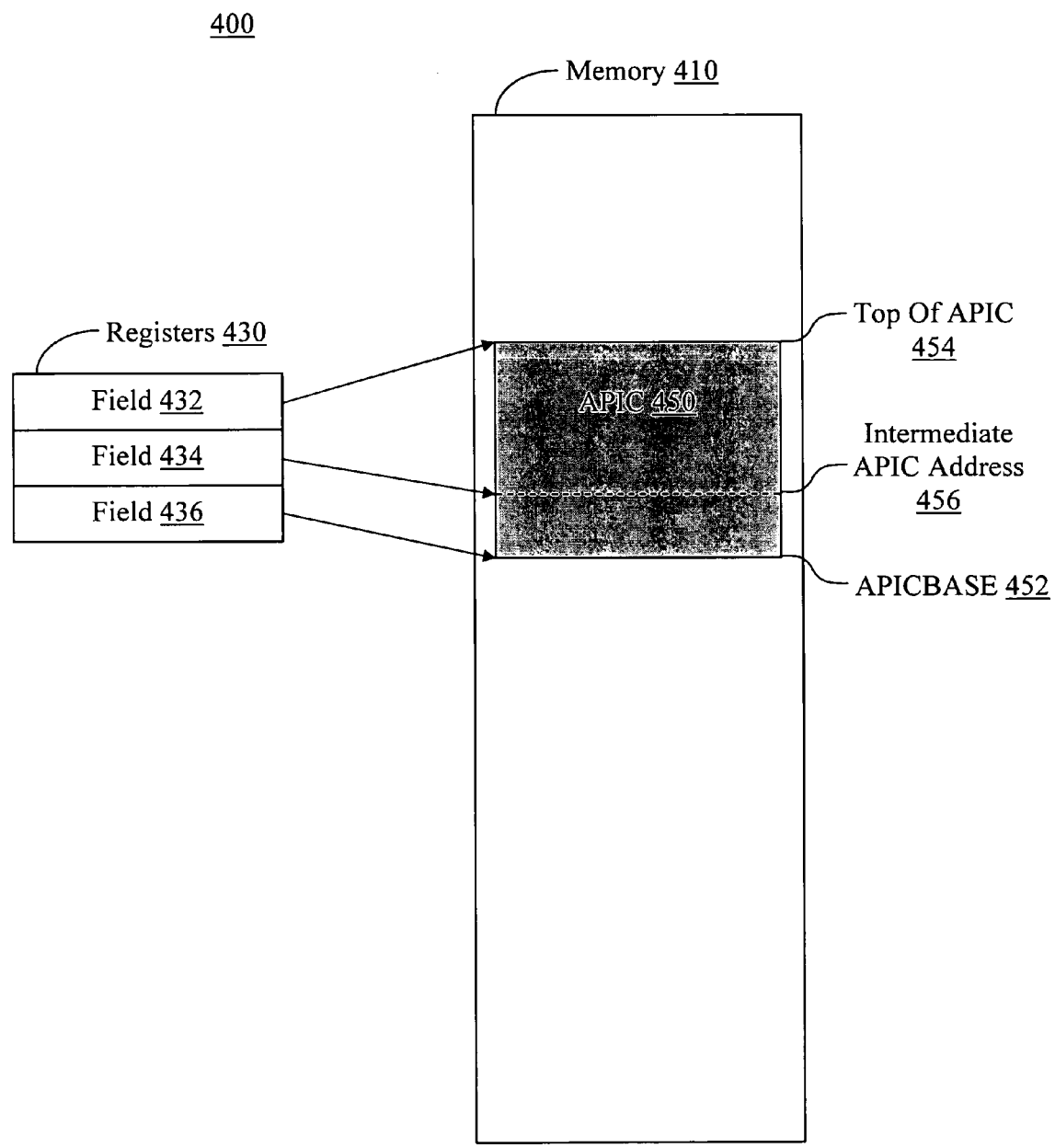
FIG. 4 shows a block diagram depicting a memory mapping of an APIC in accordance with one embodiment of the present invention.

FIG. 4 shows block diagram 400 depicting a memory mapping of APIC 450 in accordance with one embodiment of the present invention. As shown in FIG. 4, memory 410 may be physical memory (e.g., 140 and/or 240) accessible by a processor (e.g., 110 and/or 210) of a computer system (e.g., 100 and/or 200). Accordingly, a portion of memory 410 may be used for the mapping an APIC (e.g., 114). For example, APIC 450 is mapped to a portion of memory 410 between addresses APICBASE 452 and top of APIC 454.

To effectively reduce APIC attacks by reducing APIC interference with accesses to SMRAM, a processor may track the location and/or size of APICs. As shown in FIG. 4, registers 430 may be used by a processor to track the location of APIC 450 within memory 410, where the registers comprise a number of fields. Specifically, field 432 contains information (e.g., a pointer) to top of APIC 454, and field 436 contains information about APICBASE 452. As such, the processor may then determine that APIC 450 is mapped to memory 410 between the addresses APICBASE 452 and top of APIC 454.

Alternatively, the processor may estimate the location and/or size of the mapping of APIC 450 by using one or more known addresses (e.g., stored in registers 430) and information about the extent of the APIC mapping on either side of the known address or addresses. For example, if the processor knows that the APIC mapping is roughly 4 kilobytes in length and can access field 436 of registers 430 to determine or estimate APICBASE 452, the processor can determine top of APIC by adding 4 kilobytes to APICBASE 452. Additionally, the processor may access field 434 of registers 430 to determine intermediate APIC address 456. Provided the processor can estimate the extent of the APIC mapping on either side of intermediate APIC address 456 (e.g., 2500 bytes above and 1500 bytes below), the processor can determine or approximate the location and/or size of the APIC mapping.

Registers 430 may comprise one or more registers (e.g., 116 and/or 126) within a processor (e.g. 110 and/or 210) for tracking the size and/or location of an APIC mapping. As such, registers 430 may be MSRs or non-MSRs. Additionally, although fields 432, 434 and 436 are shown as contiguous fields, it should be appreciated that the fields may be non-contiguous fields with the same or different registers. And although fields 432, 434 and 436 all point to locations representing a contiguously-mapped APIC block within the same memory (e.g., 410), it should be appreciated that the APIC mapping may be spread over multiple locations of one or more memories. As such, the fields of registers 430 may point to one or more locations within the same memory, or instead to locations within two or more memories.

Figure 5:
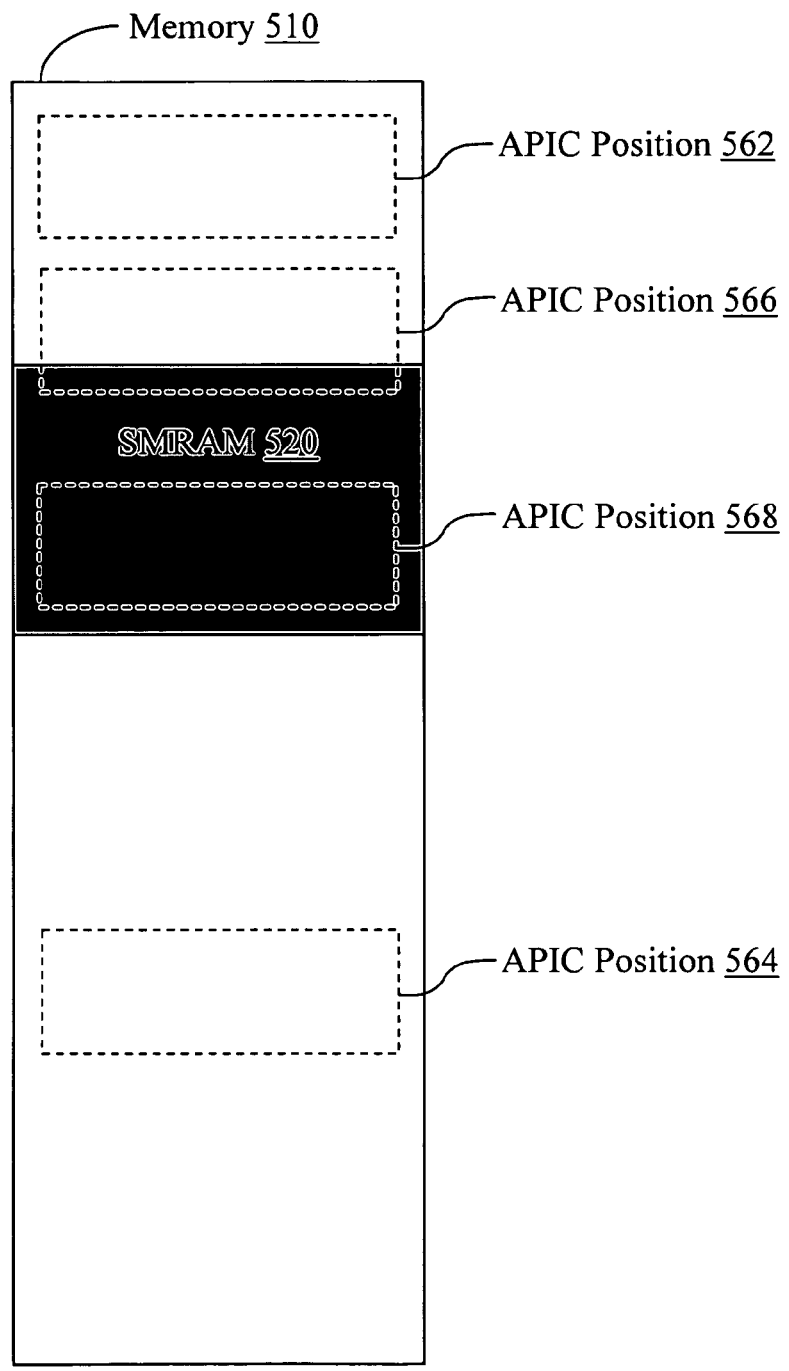
FIG. 5 shows a block diagram depicting various locations of an APIC memory mapping in accordance with one embodiment of the present invention.

FIG. 5 shows block diagram 500 depicting various locations of an APIC memory mapping in accordance with one embodiment of the present invention. As shown in FIG. 5, memory 510 may be physical memory (e.g., 140 and/or 240) accessible by a processor (e.g., 110 and/or 210) of a computer system (e.g., 100 and/or 200). Accordingly, a portion of memory 510 may be designated as SMRAM (e.g., 145 and/or 245) as discussed above with respect to FIG. 3.

Referring back to FIG. 4, APIC 450 represented a memory mapping of a local APIC of a processor, whose position within memory 410 may be defined by top of APIC 454, intermediate APIC address 456 and/or APICBASE 452. Accordingly, the location of APIC 450 may be adjusted within memory 410 by altering one of the address values within registers 430.

Turning again to FIG. 5, four different APIC mapping positions are shown, which may be determined by adjusting register values indicating addresses within physical memory to which an APIC is mapped. For example, APIC position 562 represents an APIC mapped above SMRAM 520 with no overlap, while APIC position 564 represents an APIC mapped below SMRAM with no overlap. While APIC positions 562 and 564 do not overlap SMRAM 520, the APIC may be mapped over SMRAM in other embodiments. For example, APIC position 566 represents an APIC mapped with some overlap of SMRAM 520, and APIC position 568 represents an APIC mapped within SMRAM 520.

As discussed above with respect to FIGS. 1 and 2, embodiments of the present invention improve the security of processing by reducing interference of the APIC with accesses to SMRAM. Since the APIC is mapped to physical memory and can overlap SMRAM (e.g., APIC positions 566 and 568), the APIC presents a security threat if allowed to intercept or otherwise interfere with accesses to SMRAM as SMM code is then forced to read values other than those that were previously written. However, embodiments neutralize such attacks by reducing and/or preventing APIC interference with accesses to SMRAM, which effectively allows trusted memory accesses to "see through" an overlapping and malicious APIC mapping.

Enhanced Northbridge with Local APIC

Figure 6:
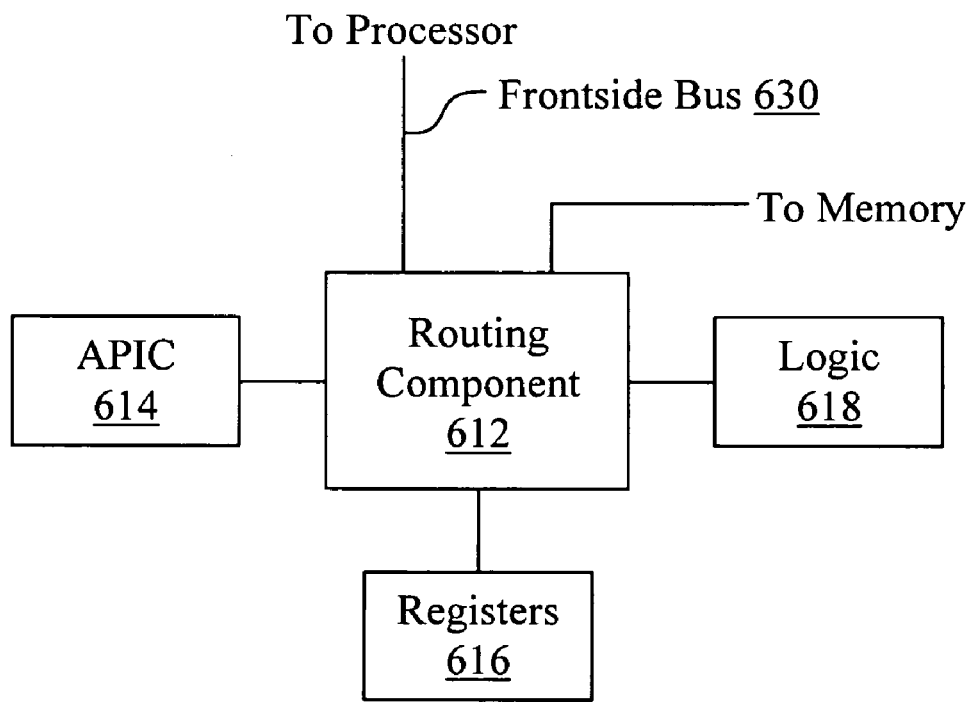
FIG. 6 shows a block diagram of an enhanced northbridge for processing more securely in accordance with one embodiment of the present invention.

FIG. 6 shows a block diagram of enhanced northbridge 600 for processing more securely in accordance with one embodiment of the present invention. As shown in FIG. 6, northbridge 600 comprises a routing component 612 that couples to memory (e.g., 140 and/or 240). A processor (e.g., 110 and/or 210) couples to routing component 612 via frontside bus 630. Additionally, registers 616 are shown coupled to routing component 612, where registers 616 may track the location, size and/or enabled status of SMRAM (e.g., 145 and/or 245).

However, in contrast to conventional systems utilizing x86 processors, northbridge 600 comprises additional components to reduce the ability of an APIC to compromise the security of SMRAM and SMM operation. Specifically, northbridge 600 is modified to include APIC 614 such that the processor may direct all requests to the northbridge along with an indication of the type of request (e.g., read, write, code fetch, etc.). Additionally, logic 618 is coupled to routing component 612 such that upon receiving a request from the processor and determining the location, size and/or enabled status of SMRAM (e.g., by accessing registers 616), northbridge 600 may reprioritize SMRAM above the APIC to reduce APIC interference with accesses to SMRAM during SMM. As such, northbridge 600 may effectively reduce APIC attacks and increase the security of proprietary, confidential or otherwise secure data stored in SMRAM.

Although northbridge 600 is depicted in FIG. 6 as having only a single routing component (e.g., 612), it should be appreciated that northbridge 600 may have two or more routing components in other embodiments. Similarly, although northbridge 600 is depicted with only one APIC, northbridge 600 may comprise multiple APICs in other embodiments (e.g., corresponding to multiple processors). Where multiple APICs are implemented, it should be appreciated that one or more APICs may couple to any given routing component (e.g., 612) within northbridge 600.

Northbridge 600 may track the location of SMRAM using registers 616, which is important to reducing APIC interference with accesses to SMRAM during SMM. Registers 616 may contain any form of data enabling the determination and/or approximation of the location of SMRAM (e.g., 145 and/or 245). For example, registers 116 may contain an address indicating the top of SMRAM (e.g., TOM) and/or an address indicating the bottom of SMRAM (e.g., TOM minus TSEG). Alternatively, one or more intermediate addresses indicating the location of SMRAM may be stored within registers 616. Moreover, it should be appreciated that alternate means may be used to locate SMRAM (e.g., by storing an extent of SMRAM on one or both sides of a given address within physical memory, etc.).

Registers 616 may also be used to store data indicating whether SMRAM (e.g., 145 and/or 245) is enabled or disabled. Although a flag within registers 616 may be toggled to indicate the enabled status of SMRAM, other means may be used.

Although registers 616 are depicted in FIG. 6 as a single register, it should be appreciated that registers 616 may contain one or more registers. Additionally, although registers 616 are depicted as a separate component from routing component 612, they may also be integrated within routing component 612. Moreover, it should be appreciated that the location, size and/or enabled status of SMRAM may be stored within a single register, or rather each within a separate register. Further, the location, size and/or enabled status of SMRAM may span more than one register.

Once northbridge 600 determines the location of SMRAM (e.g., 145 and/or 245), logic 618 may be used to reduce interference of APIC 614 with accesses to SMRAM. For example, if it is determined that the address of a request falls within an address range corresponding to SMRAM, routing component 612 may decide to route requests away from APIC 614 and instead toward memory (e.g., 140 and/or 240). As such, the hardware configuration of northbridge 600 as depicted in FIG. 6 enables routing component 612 to intelligently route requests knowing the location of SMRAM. In another embodiment, northbridge 600 may access both the location and enabled status of SMRAM to further enhance routing capabilities.

Although the logic enhancements to northbridge 600 may be implemented in alternative fashions, the following is exemplary coded logic that may be performed by logic 618 to reduce interference of APIC 614 with accesses to SMRAM:

```
if (paddr in SMRAM) && (SMRAM enabled) && (pro-
    cessor in SMM) {route request to SMRAM based on
    paddr
}
else if ((paddr is on APIC page) && (request is not code
    fetch) {route request to local APIC
}
else {route request to DRAM or devices based on paddr
    and settings in northbridge
}
```

Accordingly, in one embodiment, northbridge 600 may route requests to SMRAM if the address of the request falls within a range of SMRAM determined or approximated by northbridge 600 (e.g., by accessing a register of registers 616 containing information relating to the location of SMRAM), SMRAM is enabled (e.g., by accessing a register of registers 616 containing information about the enabled status of SMRAM), and the processor is in SMM. If any of these conditions is not met, northbridge 600 may route the request to APIC 614 if the address of the request is on the memory page to which the APIC is mapped and the request is not a code fetch (e.g., is instead a read, write, etc.). The northbridge may track the location of the APIC mapping by receiving information from the processor (e.g. used in a computer system with a processor enhanced to issue such transactions to the northbridge) relating to a change in the APIC mapping location as discussed above with respect to FIG. 4. If any of these conditions are not met, the request may be routed to devices or components of the computer system (e.g., DRAM, etc.) based upon the address of the request and settings within the northbridge.

Although logic 618 is depicted in FIG. 6 as a separate component from routing component 612, it should be appreciated that logic 618 may also be integrated within routing component 612. Additionally, although logic 618 is depicted in FIG. 6 as a single component, logic 618 may comprise more than one functional block which operate together to effectively reduce interference of APIC 614 with accesses to SMRAM (e.g., 145 and/or 245).

Figure 7:
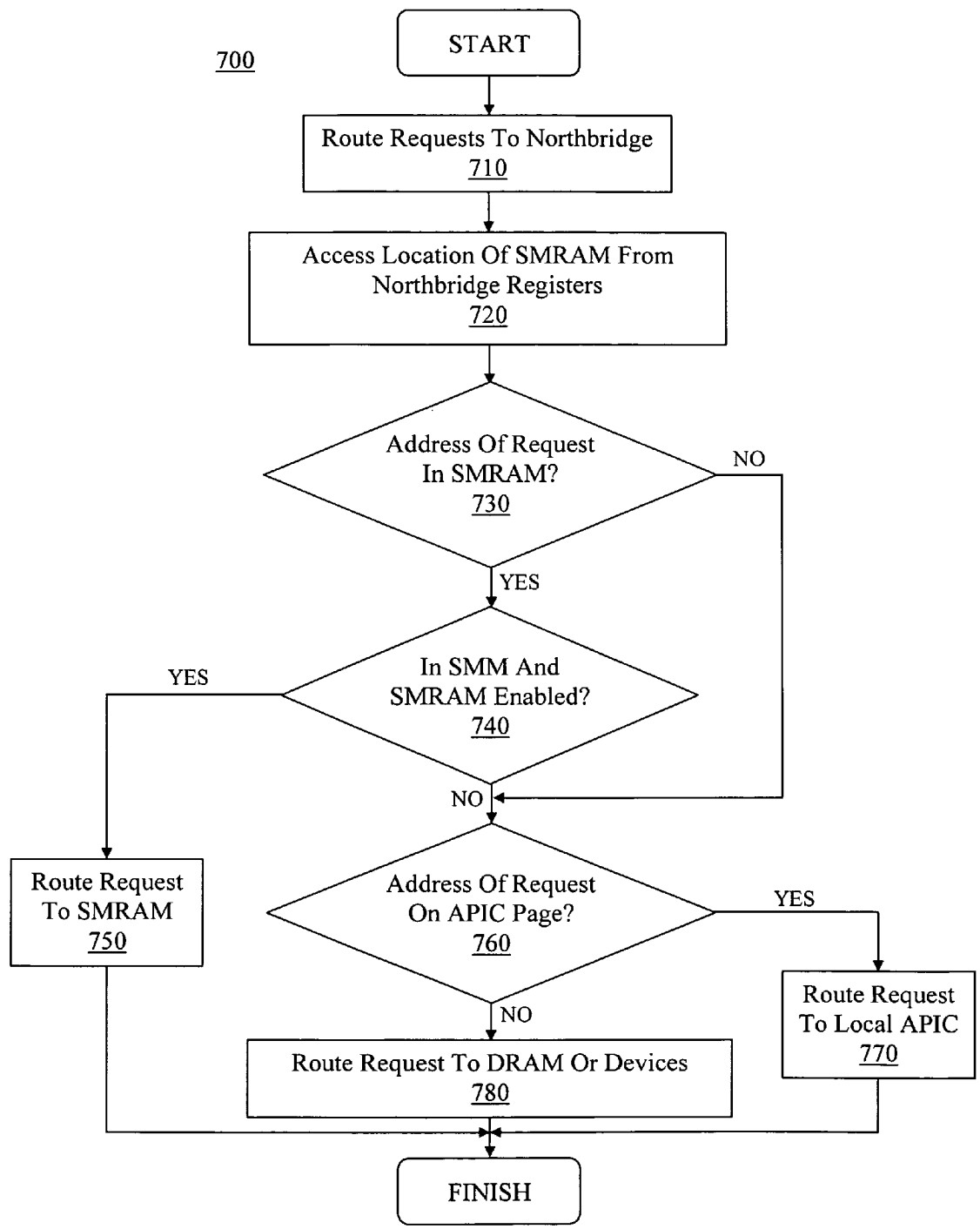
FIG. 7 shows a computer-implemented process for processing more securely with an enhanced northbridge in accordance with one embodiment of the present invention.

FIG. 7 shows computer-implemented process 700 for processing more securely with an enhanced northbridge in accordance with one embodiment of the present invention. As shown in FIG. 7, step 710 involves routing all requests received by a processor (e.g., 110 and/or 210) to the northbridge (e.g., 120, 220 and/or 600). Requests may be routed over a frontside bus (e.g., 130 and/or 230). Additionally, a processor may transmit an indication of the request type (e.g., read, write, code fetch, etc.) to the northbridge.

Upon receiving the request, the northbridge may access a current location of SMRAM from a northbridge register (e.g., 616) in step 720. The current location may be determined by one or more accesses to a plurality of registers to determine or approximate an address range of SMRAM as described above with respect to FIG. 3.

Once the location of SMRAM is accessed, a determination of whether the address of the request is within SMRAM is performed in step 730. Accordingly, the address of the request is compared to the address range determined or approximated in step 720. Although a strict comparison may be made in step 730, it should be appreciated that a looser comparison may be made (e.g., to account for approximation error) using either a predetermined tolerance or a tolerance generated on the fly for the address range of SMRAM. As such, if it is determined that the address of the request is not in SMRAM, then step 760 may be performed. Alternatively, if it is determined that the address of the request is within SMRAM, then step 740 may be performed.

As shown in FIG. 7, step 740 involves determining whether the processor is in SMM and whether SMRAM is enabled. Given that SMM is an operating mode of the processor and that SMM code accesses SMRAM during SMM, it is appreciated that such determinations may be made in a variety of manners (e.g., through register accesses, microcode parsing, etc.). Additionally, it may be determined that the processor enters SMM at various points during the transition from non-SMM operation to SMM operation (e.g. upon detecting a system management interrupt (SMI), before saving the processor state, after saving the processor state, etc.) such that APIC interference with accesses to SMRAM is reduced appropriately to improve the security of processing. Similarly, the conclusion of SMM may be determined at various points during the transition from SMM operation to non-SMM operation (e.g. before restoring processor state, after restoring processor state, until a resume (RSM) instruction is completed, etc.).

Therefore, if it is determined that both the processor is in SMM and SMRAM is enabled in step 740, then the request may be routed to SMRAM in step 750. Alternatively, if it is determined that either the processor is not in SMM or the SMRAM is not enabled, then step 760 may be performed.

As shown in FIG. 7, step 760 involves determining whether a request targets an address on the memory page to which the APIC is mapped (e.g., 450). If it is determined that the request is associated with an address on the APIC page, then the request is routed to the local APIC (e.g., 614). However, if it is determined that the request is not associated with an address on the memory page to which the APIC is mapped, then the request may be routed to DRAM or a device in step 780.

Thus, embodiments increase computer system security by limiting APIC interference with accesses to SMRAM. Specifically, by placing the APIC in the northbridge (e.g., 600), routing logic (e.g., as represented by process 700) can effectively reduce the ability of the APIC to intercept processor requests intended for SMRAM.

Controlling Placement of APIC Over SMRAM

Figure 8:
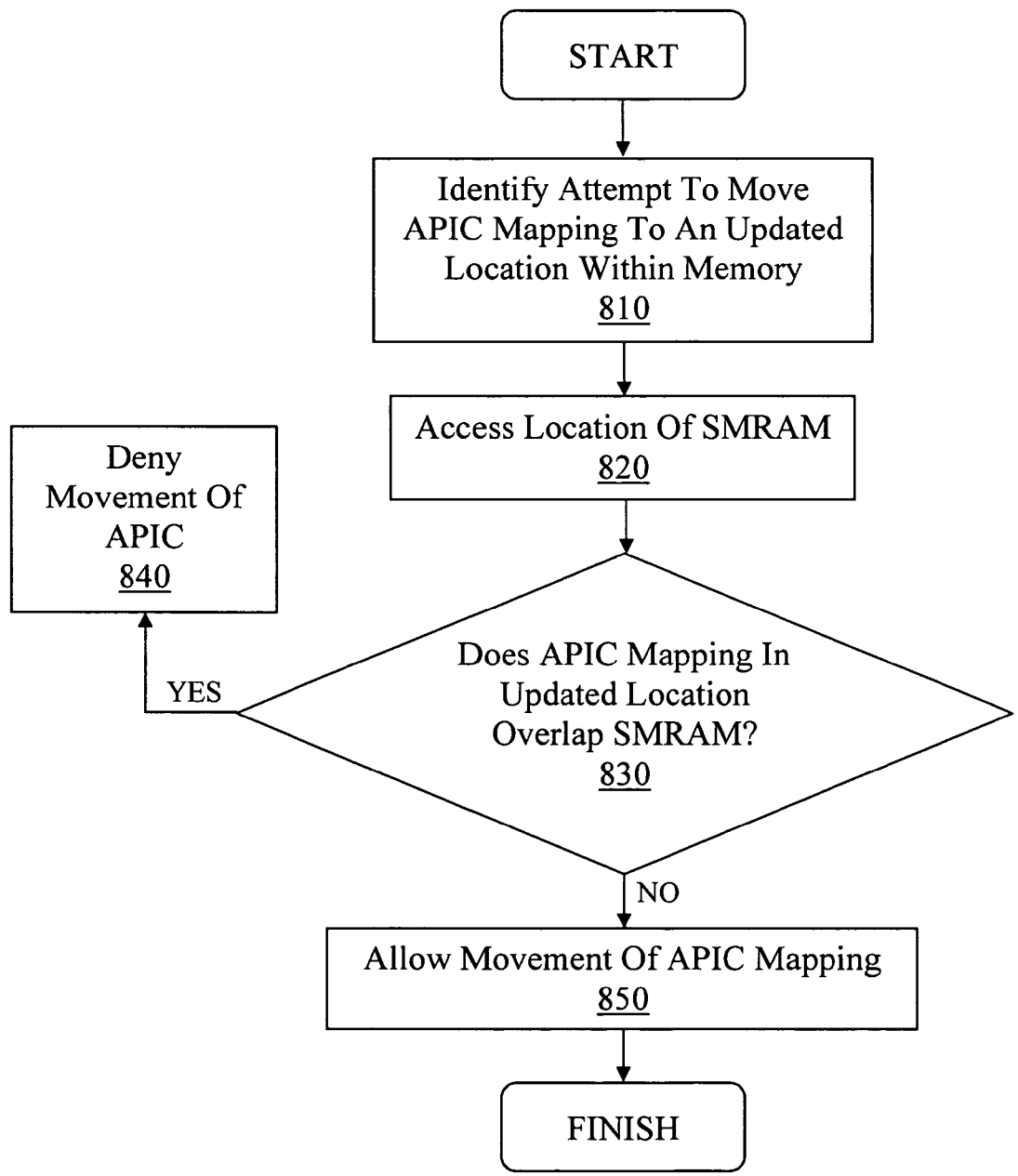
FIG. 8 shows a computer-implemented process for controlling the placement of an APIC to improve the security of processing in accordance with one embodiment of the present invention.

FIG. 8 shows computer-implemented process 800 for controlling the placement of an APIC to improve the security of processing in accordance with one embodiment of the present invention. As shown in FIG. 8, step 810 involves identifying an attempt to move an APIC mapping to an updated location within memory. As discussed above with respect to FIGS. 3 and 5, an APIC mapping (e.g., 450) within a memory (e.g. 410) can be moved by altering a value within a register (e.g., 430) containing information about a part of an APIC mapping (e.g., a base address). The updated location within memory occupied by the APIC mapping may be an APIC position (e.g., 562, etc.) as depicted in FIG. 5.

After identifying an attempt to move an APIC mapping, a current location of SMRAM may be accessed in step 820. The current location may be determined by one or more accesses to a plurality of registers to determine or approximate an address range of SMRAM as described above with respect to FIG. 3. In one embodiment, processor registers (e.g., 116 and/or 216) may be accessed. In another embodiment, northbridge registers (e.g., 616) may be accessed.

As shown in FIG. 8, step 830 involves making a determination as to whether the APIC mapping in the updated location (e.g., from step 810) overlaps the location of SMRAM (e.g., from step 820). An overlap may be identified if a portion of an address range of the updated APIC mapping is shared with a portion of an address range of SMRAM (e.g., APIC positions 566 and/or 568). The minimum size of the overlapping portion such that an overlap is determined may be predetermined, or alternatively, determined on the fly. For example, if the minimum is set at a very small overlap, an overlap may be determined by APIC position 566 of FIG. 5. However, if the overlap is set very high (e.g., complete overlap), then APIC position 568 may signal an overlap while APIC position 566 may not.

If an overlap is not determined in step 830, then the movement of the APIC mapping to the updated location may be denied in step 840. The movement of the APIC mapping may be prevented by ignoring a request to write a new location to a register storing location information about the APIC mapping (e.g., registers 430). Alternatively, a processor fault (e.g., a #GP fault) may be raised such that the APIC mapping is not moved to the updated location. However, if an overlap is not determined in step 830, then a movement of the APIC mapping to the updated location may be allowed in step 850. As such, movement of the APIC mapping to a location which may interfere unacceptably with accesses to SMRAM may be prevented, while movement which will cause no interference or an acceptable amount of interference may be allowed.

Using SMM Code to Control the Placement of APIC Over SMRAM

Figure 9:
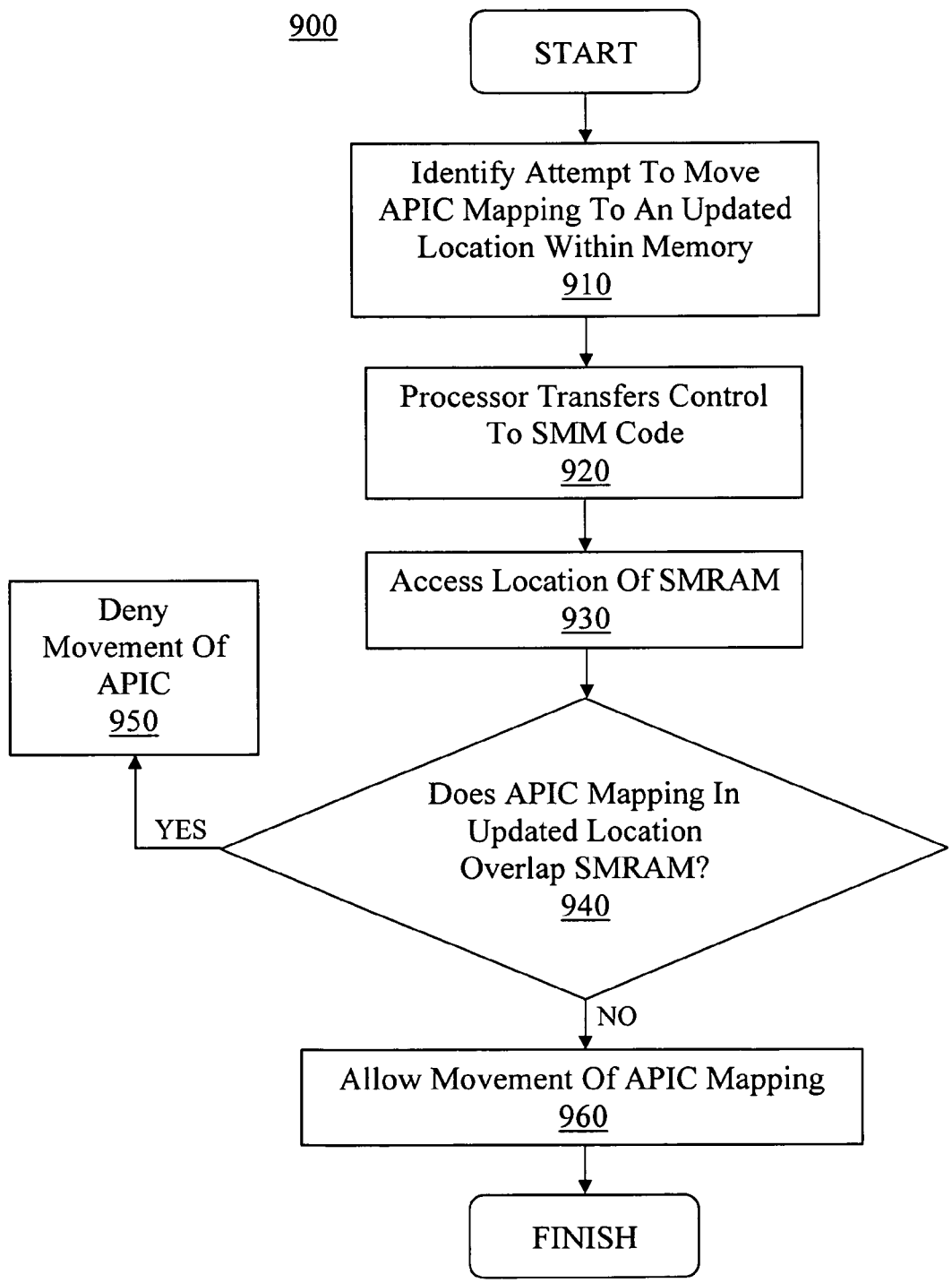
FIG. 9 shows a computer-implemented process for controlling the placement of an APIC using SMM code to improve the security of processing in accordance with one embodiment of the present invention.

FIG. 9 shows computer-implemented process 900 for controlling the placement of an APIC using SMM code to improve the security of processing in accordance with one embodiment of the present invention. As shown in FIG. 9, step 910 involves identifying an attempt to move an APIC mapping to an updated location within memory. As discussed above with respect to FIGS. 3 and 5, an APIC mapping (e.g., 450) within a memory (e.g. 410) can be moved by altering a value within a register (e.g., 430) containing information about a part of an APIC mapping (e.g., a base address). The updated location within memory occupied by the APIC mapping may be an APIC position (e.g., 562, etc.) as depicted in FIG. 5.

After identifying an attempt to move an APIC mapping, control may be transferred to SMM code in step 920. As such, SMM code may thereafter implement steps of process 900 to reduce APIC interference with accesses to SMRAM and improve the security of processing.

As shown in FIG. 9, a current location of SMRAM may be accessed in step 930. The current location may be determined by one or more accesses to a plurality of registers to determine or approximate an address range of SMRAM as described above with respect to FIG. 3. In one embodiment, processor registers (e.g., 116 and/or 216) may be accessed by SMM code. In another embodiment, northbridge registers (e.g., 616) may be accessed by SMM code.

Thereafter, step 940 involves SMM code making a determination as to whether the APIC mapping in the updated location (e.g., from step 910) overlaps the location of SMRAM (e.g., from step 930). An overlap may be identified if a portion of an address range of the updated APIC mapping is shared with a portion of an address range of SMRAM (e.g., APIC positions 566 and/or 568). The minimum size of the overlapping portion such that an overlap is determined may be predetermined, or alternatively, determined on the fly. For example, if the minimum is set at a very small overlap, an overlap may be determined by APIC position 566 of FIG. 5. However, if the overlap is set very high (e.g., complete overlap), then APIC position 568 may signal an overlap while APIC position 566 may not.

If an overlap is not determined in step 940, then the movement of the APIC mapping to the updated location may be denied in step 950 by SMM code. The movement of the APIC mapping may be prevented by ignoring a request to write a new location to a register storing location information about the APIC mapping (e.g., registers 430). Alternatively, a processor fault (e.g., a #GP fault) may be raised by SMM code such that the APIC mapping is not moved to the updated location. However, if an overlap is not determined in step 940, then a movement of the APIC mapping to the updated location may be allowed by SMM code in step 960. As such, movement of the APIC mapping to a location which may interfere unacceptably with accesses to SMRAM may be prevented using SMM code, while movement which will cause no interference or an acceptable amount of interference may be allowed.

Relocation of APIC Mapping During SMM

Figure 10:
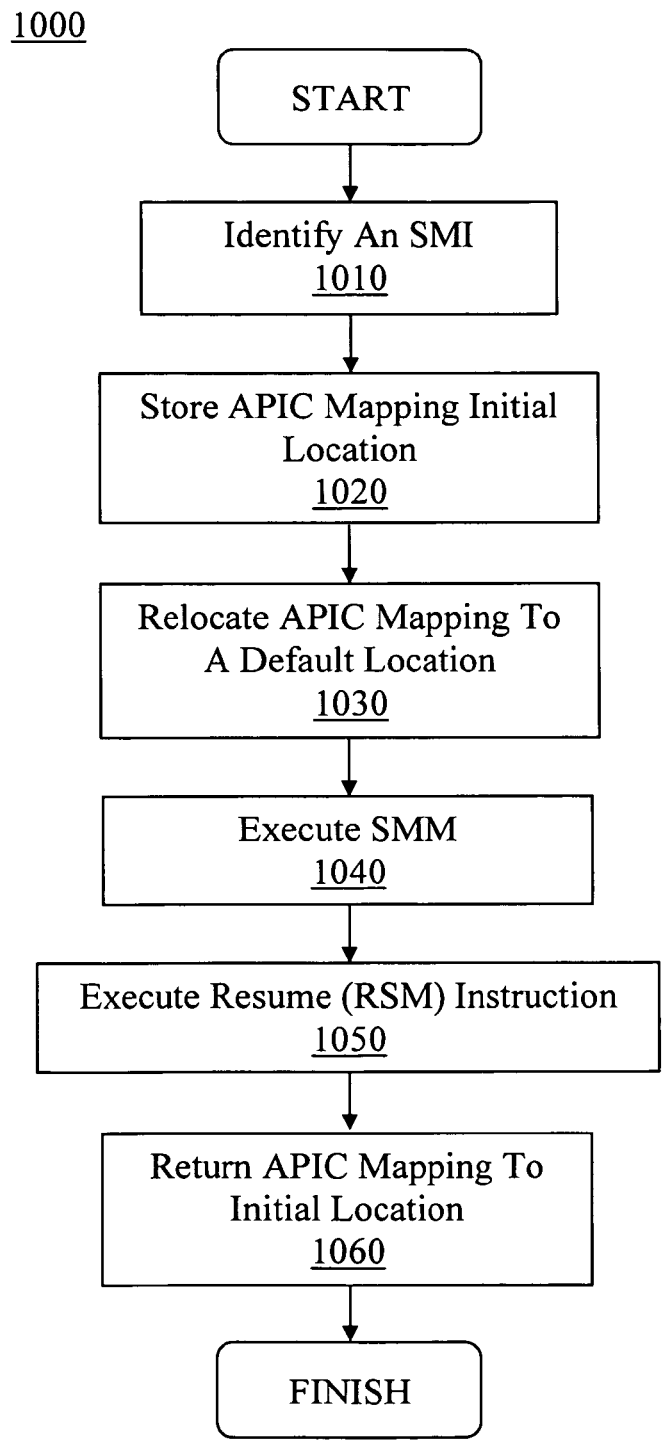
FIG. 10 shows a computer-implemented process for relocation of an APIC mapping during SMM to improve the security of processing in accordance with one embodiment of the present invention.

FIG. 10 shows computer-implemented process 1000 for relocation of an APIC mapping during SMM to improve the security of processing in accordance with one embodiment of the present invention. As shown in FIG. 10, step 1010 involves identifying an SMI. The SMI may be identified by a hardware signal (e.g., to the processor), or alternatively by software code (e.g., microcode, etc.) transmitted to and/or executed by the processor.

Upon identifying an SMI, an initial location of an APIC mapping may be stored in step 1020. The initial location of the APIC mapping may be an address range to which an APIC is mapped (e.g., 450) prior to the SMI. Additionally, the initial location may be stored by the processor in a save state area of SMRAM.

As shown in FIG. 10, step 1030 involves relocating an APIC mapping to a default location. The default location may be that used by a processor upon processor reset. Alternatively, a location with minimal or no overlap (e.g., 562, 564, 566, etc.) may serve as the default location, so long as known by the processor and/or SMM code running on the processor. As such, the APIC may be moved during SMM (e.g., as described above with respect to FIG. 4) to reduce interference with accesses to SMRAM.

After relocating the APIC mapping to a default location, the processor may execute SMM in step 1040. Thereafter, a resume (RSM) instruction may be executed in step 1050, which may be followed or executed simultaneously with a return of the APIC mapping to the initial location (e.g., as determined in step 1020) in step 1060. As such, the APIC may be returned to its pre-SMM location upon return from SMM to maintain proper non-SMM operation of the enhanced processor.

Figure 11A:
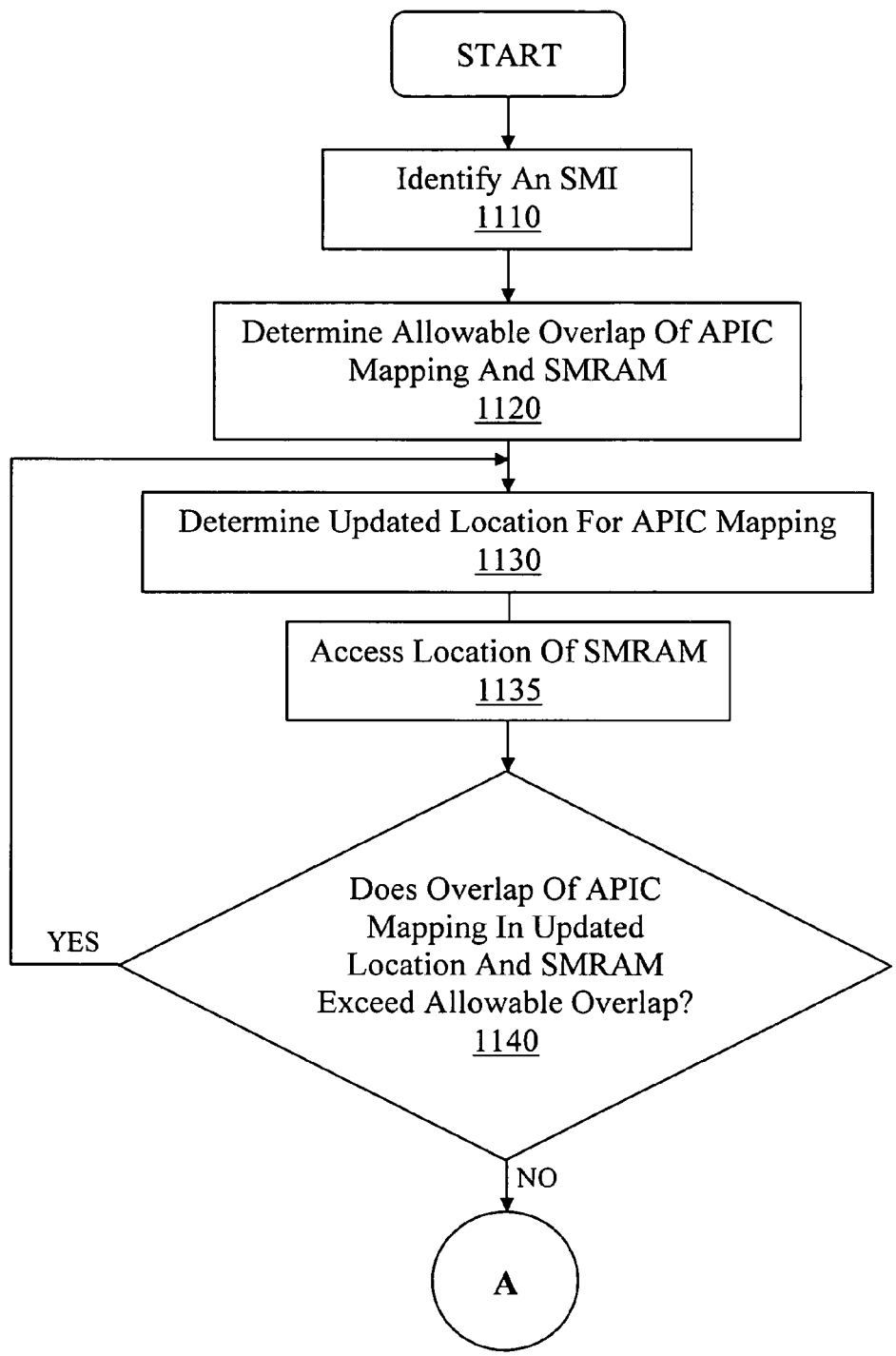
FIG. 11A shows a first portion of a computer-implemented process for relocation of an APIC mapping during SMM to improve the security of processing in accordance with one embodiment of the present invention.
Figure 11B:
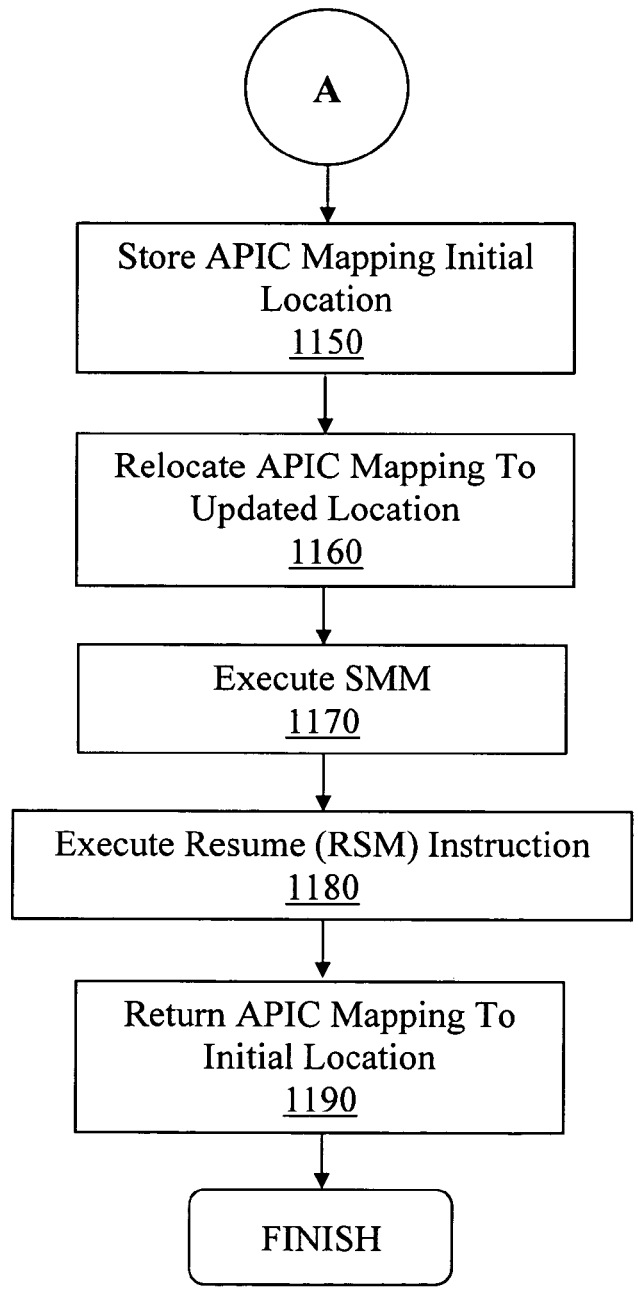
FIG. 11B shows a second portion of a computer-implemented process for relocation of an APIC mapping during SMM to improve the security of processing in accordance with one embodiment of the present invention.

FIGS. 11A and 11B show computer-implemented process 1100 for relocation of an APIC mapping during SMM to improve the security of processing in accordance with one embodiment of the present invention. As shown in FIG. 11A, step 1110 involves identifying an SMI. The SMI may be identified by a hardware signal (e.g., to the processor), or alternatively by software code (e.g., microcode, etc.) transmitted to and/or executed by the processor.

After identifying an SMI, an allowable overlap of an APIC mapping and SMRAM may be determined in step 1120. The allowable overlap may be determined by an amount of overlap relating to an acceptable amount of interference by the APIC with accesses to SMRAM. As such, the allowable overlap may not exceed an amount of overlap such that the interference is unacceptable, where the acceptability threshold may be predetermined or determined by the processor on the fly. Alternatively, where minimal or no interference is desired, the allowable overlap may be determined to be minimal or non-existent.

As shown in FIG. 11A, step 1130 involves determining an updated location for the APIC mapping within physical memory. Thereafter, the current location of SMRAM is accessed in step 1135. The current location may be determined by one or more accesses to a plurality of registers to determine or approximate an address range of SMRAM as described above with respect to FIG. 3. In one embodiment, processor registers (e.g., 116 and/or 216) may be accessed. In another embodiment, northbridge registers (e.g., 616) may be accessed.

After determining an updated location for the APIC mapping and the current location of SMRAM, a determination is made in step 1140 as to whether the overlap of the APIC mapping and SMRAM exceed the allowable overlap (e.g., determined in step 1120). If it is determined that the actual overlap exceeds the allowable overlap, then steps 1130 and 1135 may be repeated. Alternatively, if it is determined that the actual overlap does not exceed the allowable overlap, step 1150 may be performed.

As shown in FIG. 11B, step 1150 involves storing an initial location of an APIC mapping. The initial location of the APIC mapping may be an address range to which an APIC is mapped (e.g., 450) prior to the SMI. Additionally, the initial location may be stored by the processor in a save state area of SMRAM.

After storing an initial location of an APIC mapping, the APIC mapping may be relocated by SMM code to an updated location in step 1160. The updated location may be that determined in step 1130. As such, the APIC may be moved during SMM (e.g., as described above with respect to FIG. 4) to reduce interference with accesses to SMRAM.

As shown in FIG. 11B, step 1170 involves executing SMM. Thereafter, an RSM instruction may be executed in step 1180, which may be followed or executed simultaneously with a return of the APIC mapping to the initial location (e.g., as determined in step 1150) in step 1190. As such, the APIC may be returned to its pre-SMM location upon return from SMM to maintain proper non-SMM operation of the enhanced processor.

Disabling of APIC During SMM

Figure 12:
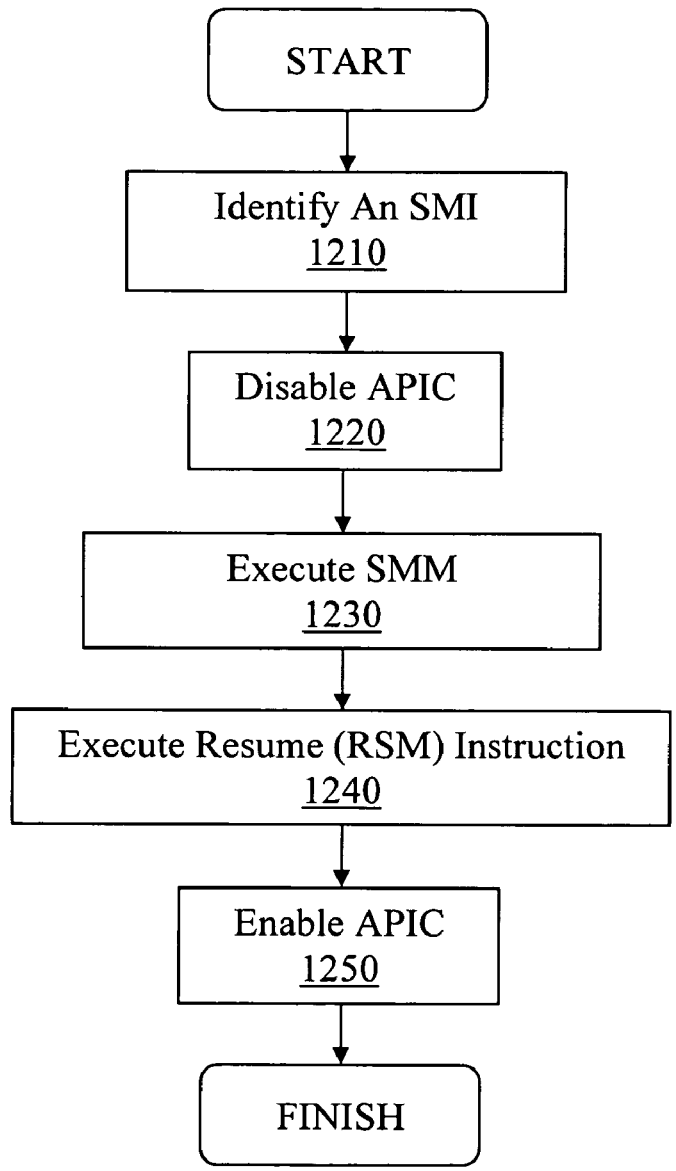
FIG. 12 shows a computer-implemented process for disabling an APIC to improve the security of processing in accordance with one embodiment of the present invention.

FIG. 12 shows computer-implemented process 1200 for disabling an APIC to improve the security of processing in accordance with one embodiment of the present invention. As shown in FIG. 12, step 1210 involves identifying an SMI. The SMI may be identified by a hardware signal (e.g., to the processor), or alternatively by software code (e.g., microcode, etc.) transmitted to and/or executed by the processor.

After identifying an SMI, the APIC may be disabled in step 1220. The APIC may be disabled by toggling a global enable/disable flag, where the flag may be stored within a register of the processor (e.g., 116 and/or 216) or the northbridge (e.g., 616). Alternatively, toggling the state of a software enable/disable flag may be used to disable the APIC, where the flag may be stored within a register of the processor (e.g., 116 and/or 216) or the northbridge (e.g., 616). And in another embodiment, other means may be used to disable the APIC. As such, once the APIC is disabled, it should be appreciated that the memory mapping of the APIC may be disrupted such that interference by the APIC with accesses to SMRAM is reduced.

As shown in FIG. 12, step 1230 involves executing SMM. Thereafter, an RSM instruction may be executed in step 1240, which may be followed by enabling the APIC in step 1250. The APIC may be enabled by toggling a global enable/disable flag as discussed above with respect to step 1220. Alternatively, the APIC may be enabled by toggling a software enable/disable flag as discussed above with respect to step 1220. And in another embodiment, other means may be used to enable the APIC. As such, the APIC may be enabled to resume normal operation once the processor has exited SMM and the threat of APIC attacks has been reduced and/or prevented.

Reducing APIC Interference Prior to SMM

Figure 13:
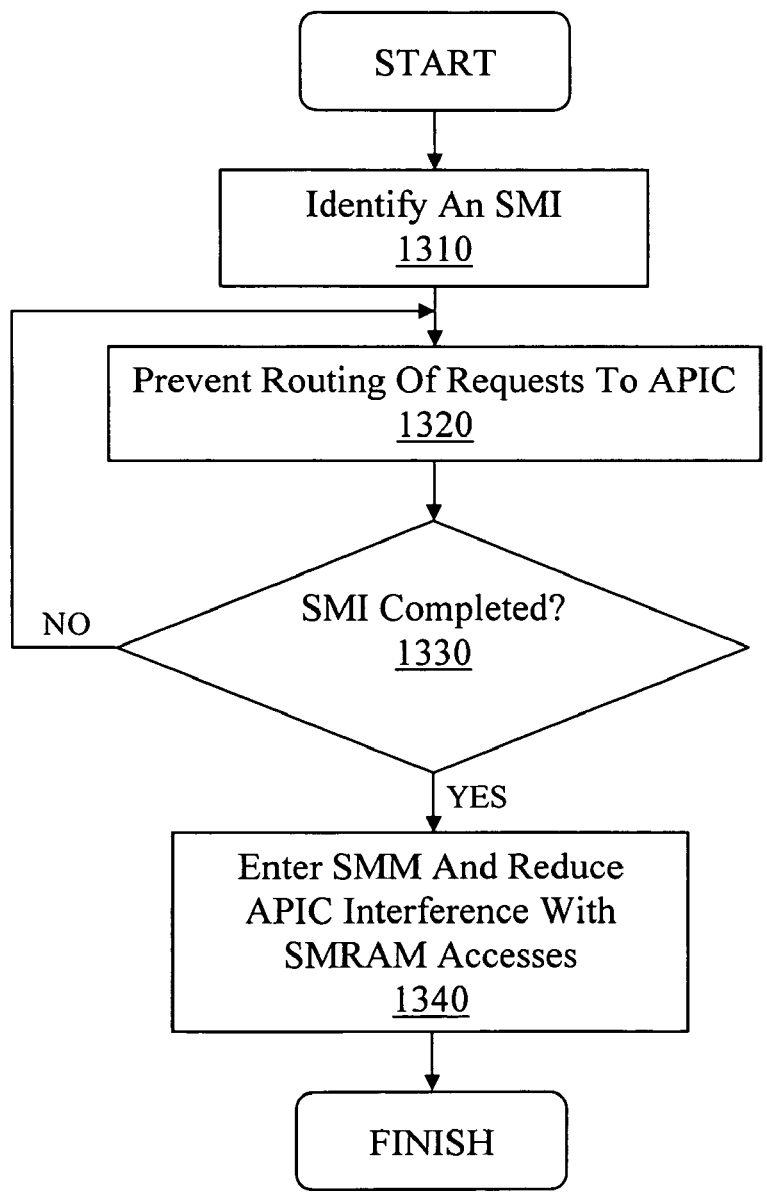
FIG. 13 shows a computer-implemented process for reducing APIC interference with accesses to SMRAM prior to SMM in accordance with one embodiment of the present invention.

FIG. 13 shows computer-implemented process 1300 for reducing APIC interference with accesses to SMRAM prior to SMM in accordance with one embodiment of the present invention. As shown in FIG. 13, step 1310 involves identifying an SMI. The SMI may be identified by a hardware signal (e.g., to the processor), or alternatively by software code (e.g., microcode, etc.) transmitted to and/or executed by the processor.

After identifying an SMI, the routing of requests to the APIC may be prevented in step 1320. For example, a routing component in the processor (e.g., 112 and/or 212) may route requests to a northbridge, thereby preventing the routing of requests to the APIC (e.g., 114 and/or 214). Alternatively, a routing component in the northbridge (e.g., 612) may route requests to other components or systems with a computer system (e.g., memory, southbridge for device access, etc.) instead of to the APIC (e.g., 614).

As shown in FIG. 13, step 1330 involves making a determination as to whether the SMI (e.g., identified in step 1310) is complete. If it is determined that the SMI is not complete, step 1320 may be repeated to continue reducing APIC interference with accesses to SMRAM until the SMI is complete. Alternatively, if it is determined that the SMI is complete, then the processor may enter SMM in step 1340. Upon entering SMM, the processor and/or northbridge may then reduce APIC interference with SMRAM (e.g., in accordance with processes 700, 800, 900, 1000, 1100 and/or 1200). Alternatively, SMM code may then reduce APIC interference with SMRAM.

Reducing APIC Interference Subsequent to SMM

Figure 14:
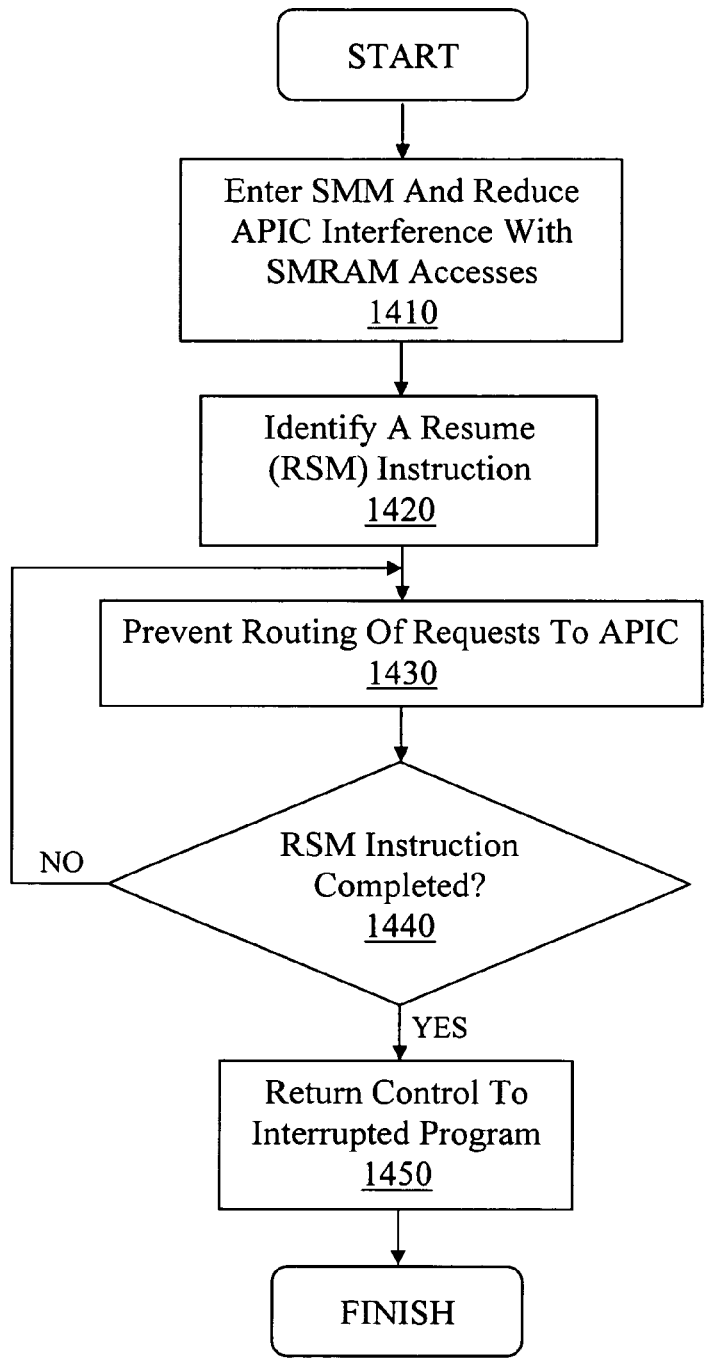
FIG. 14 shows a computer-implemented process for reducing APIC interference with accesses to SMRAM subsequent to SMM in accordance with one embodiment of the present invention.

FIG. 14 shows computer-implemented process 1400 for reducing APIC interference with accesses to SMRAM subsequent to SMM in accordance with one embodiment of the present invention. As shown in FIG. 14, the processor may enter SMM in step 1410. Upon entering SMM, the processor and/or northbridge may then reduce APIC interference with SMRAM (e.g., in accordance with processes 700, 800, 900, 1000, 1100 and/or 1200). Alternatively, SMM code may then reduce APIC interference with SMRAM.

While in SMM, an RSM instruction may be identified in step 1420. Thereafter, the routing of requests to the APIC may be prevented in step 1430. For example, a routing component in the processor (e.g., 112 and/or 212) may route requests to a northbridge, thereby preventing the routing of requests to the APIC (e.g., 114 and/or 214). Alternatively, a routing component in the northbridge (e.g., 612) may route requests to other components or systems with a computer system (e.g., memory, southbridge for device access, etc.) instead of to the APIC (e.g., 614).

As shown in FIG. 14, a determination is made in step 1440 as to whether the RSM instruction (e.g., identified in step 1420) is complete. If it is determined that the RSM instruction is not complete, step 1430 may be repeated to continue reducing APIC interference with accesses to SMRAM until the RSM instruction is complete. Alternatively, if it is determined that the RSM instruction is complete, then the processor may return control to a program interrupted by SMM in step 1450.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method comprising:
   responsive to detecting a system management interrupt (SMI), storing a first location in a portion of a physical memory to which an advanced programmable interrupt controller (APIC) is mapped prior to the SMI; and
   moving a mapping of the APIC to a second location in the physical memory for system management mode (SMM) execution, to reduce interference with accesses to system management random access memory (SMRAM) comprising a portion of the physical memory.

2. The method of claim 1 further comprising:
   returning the mapping of the APIC to the first location in response to execution of a resume (RSM) instruction.

3. The method of claim 1, wherein the second location is a default location for the APIC used in response to reset of a processor associated with the APIC.

4. The method of claim 1 further comprising:
   utilizing a plurality of registers to track a location of the SMRAM in the physical memory; and
   determining an allowable overlap of an address range to which the APIC is mapped and an address range associated with the location of the SMRAM within the physical memory;
   wherein an overlap associated with the second location is less than or equal to the allowable overlap.

5. The method of claim 4, wherein the allowable overlap is determined by SMM code.

6. The method of claim 4, wherein the first location is stored in a register of a processor associated with the APIC.

7. The method of claim 4, wherein the first location is stored within a portion of a save-state map of the physical memory.

8. A method comprising:
    identifying a system management interrupt (SMI);
    during handling of said SMI and before entering system management mode (SMM), denying a request to an advanced programmable interrupt controller (APIC) associated with a processor; and
    after handling of the SMI, allowing SMM code to reduce interference of the APIC with accesses to a portion of system management random access memory (SMRAM).

9. The method of claim 8, wherein said handling of the SMI comprises reading and writing a save-state map before entering SMM.

10. The method of claim 9, wherein the save-state map resides within the portion of SMRAM of a memory accessible by the SMM.

11. The method of claim 8, wherein said handling of said SMI concludes responsive to entering SMM.

12. A method comprising:
    reducing interference of an advanced programmable interrupt controller (APIC) associated with a processor with accesses to a portion of system management random access memory (SMRAM);
    identifying a resume (RSM) instruction;
    during handling of said RSM instruction, denying a request to the APIC; and
    transferring control back to an interrupted program.

13. The method of claim 12, wherein said handling of the RSM instruction comprises reading and writing a save-state map after exiting system management mode (SMM).

14. The method of claim 13, wherein the save-state map resides within a memory accessible by the processor when in SMM.

15. The method of claim 12, wherein said handling of said RSM instruction concludes in response to exiting SMM.

16. An article of manufacture including a computer-readable medium having instructions stored thereon that, if executed by a computing device, cause the computing device to perform operations comprising:
    responsive to detecting a system management interrupt (SMI), storing a first location in a portion of a physical memory to which an advanced programmable interrupt controller (APIC) is mapped prior to the SMI; and
    moving a mapping of the APIC to a second location in the physical memory for system management mode (SMM) execution, to reduce interference with accesses to system management random access memory (SMRAM) comprising a portion of the physical memory.

17. A system comprising:
    means for detecting a system management interrupt (SMI);
    means for storing a first location in a portion of a physical memory to which an advanced programmable interrupt controller (APIC) is mapped prior to the SMI; and
    means for moving a mapping of the APIC to a second location in the physical memory for system management mode (SMM) execution, to reduce interference with accesses to system management random access memory (SMRAM) comprising a portion of the physical memory.

18. A computer system comprising:
    a central processing unit (CPU);
    an advanced programmable interrupt controller (APIC) coupled to the CPU; and
    memory coupled to the APIC and comprising system management random access memory (SMRAM), wherein responsive to detecting a system management interrupt (SMI), a first location is stored in a portion of the memory to which the APIC is mapped prior to the SMI, wherein further a mapping of the APIC is moved to a second location in the memory for system management mode (SMM) execution, to reduce interference with accesses to the SMRAM.

19. The computer system of claim 18, wherein the mapping of the APIC is returned to the first location in response to execution of a resume (RSM) instruction.

20. The computer system of claim 18, wherein the second location is a default location for the APIC.

21. The computer system of claim 18, further comprising a plurality of registers operable for tracking a location of the SMRAM in the memory, wherein an allowable overlap of an address range to which the APIC is mapped and an address range associated with the location of the SMRAM within the physical memory are determined, wherein further an overlap associated with the second location is less than or equal to the allowable overlap.

22. The computer system of claim 18, wherein the first location is stored in a location selected from the group consisting of: a register of the CPU; a portion of a save-state map of the memory.

* * * * *

UNITED STATES PATENT AND TRADEMARK OFFICE
CERTIFICATE OF CORRECTION

| | | |
|---|---|---|
| PATENT NO. | : 7,925,815 B1 | Page 1 of 1 |
| APPLICATION NO. | : 11/479703 | |
| DATED | : April 12, 2011 | |
| INVENTOR(S) | : Dunn | |

It is certified that error appears in the above-identified patent and that said Letters Patent is hereby corrected as shown below:

Title page, item (45), under "Date of Patent", in Column 2, Line 1, delete "Apr. 12, 2011" and insert -- *Apr. 12, 2011 --.

Title page, under "Notice", in Column 1, Lines 1-3, delete
"Subject to any disclaimer, the term of this patent is extended or adjusted under 35 U.S.C. 154(b) by 189 days." and insert
-- Subject to any disclaimer, the term of this patent is extended or adjusted under 35 U.S.C. 154(b) by 189 days.
This patent is subject to a terminal disclaimer. --.

Column 14, line 63, in Claim 6, delete "claim 4," and insert -- claim 1, --.

Column 14, line 65, in Claim 7, delete "claim 4," and insert -- claim 1, --.

Signed and Sealed this
Second Day of August, 2011

David J. Kappos
*Director of the United States Patent and Trademark Office*